United States Patent [19]

Tournois

[11] 4,456,982
[45] Jun. 26, 1984

[54] IMAGING SYSTEM WITH MULTIPLE, SIMULTANEOUS TRANSMISSIONS

[75] Inventor: Pierre Tournois, Paris, France

[73] Assignee: Thomson-CSF, Paris, France

[21] Appl. No.: 309,772

[22] Filed: Oct. 8, 1981

[30] Foreign Application Priority Data

Oct. 10, 1980 [FR] France .................... 80 21681

[51] Int. Cl.³ ............................................. G01S 15/89
[52] U.S. Cl. ......................................... 367/11; 73/624; 367/100; 367/101
[58] Field of Search ............ 367/7, 11, 101, 100; 73/624, 625, 626

[56] References Cited

U.S. PATENT DOCUMENTS

| | | | |
|---|---|---|---|
| 3,577,772 | 5/1971 | Perilhou et al. | 73/624 |
| 3,771,116 | 11/1973 | Farrah | 367/101 X |
| 4,068,234 | 1/1978 | O'Meara | 367/87 X |
| 4,119,940 | 10/1978 | Keating et al. | 367/11 X |
| 4,288,866 | 9/1981 | Sackman | 367/11 |

*Primary Examiner*—Richard A. Farley

*Attorney, Agent, or Firm*—Oblon, Fisher, Spivak, McClelland & Maier

[57] ABSTRACT

A bidimensional imaging system by echoes including a transmitting array and a receiving array. The transmitting array includes a row of transmitters ($E_1, E_2, \ldots, E_i, E_N$) parallel to a direction Oz and the receiving array includes a row of receivers in a direction Ox. All the transmitters simultaneously transmit signals with different codes. The signals received are demodulated and the real and imaginary components of these signals are applied to two multiplexing circuits (61.1, 61.2). After modulation the multiplexed signals are applied to a Fourier transformation circuit (63), which sequentially supplies reception channels $V_k(\theta_k)$ for the direction referenced by angle $\theta_k$ and which are stored in memories (66.1, 66.2). Other memories (70.1, 70.2) contain signals $S_i(\phi_i)$ transmitted in an angular direction referenced by $\phi_i$. The two pairs of memories (66.1, 66.2 and 70.1, 70.2) are connected and the signals are applied after modulation to a convolver (61), which supplies signals of the bidimensional image. The imaging system has application to ultrasonic submarine cameras, submarine target classifiers, medical acoustic imaging and non-destructive tests.

23 Claims, 13 Drawing Figures

FIG.6 COMPLEX DEMODULATION CIRCUIT

FIG.7 MODULATION ON CARRIER

FIG.8 FOURIER TRANSFORMATION WITH DISPERSIVE LINES
MULTIPLICATION-CONVOLUTION-MULTIPLICATION

FIG.9 CONVOLUTION-MULTIPLICATION-CONVULATION

IMAGING SYSTEM WITH MULTIPLE, SIMULTANEOUS TRANSMISSIONS

BACKGROUND OF THE INVENTION

The present invention relates to improvements to radar or sonar echo detection systems making it possible to provide an image of the surrounding space in real time. The appratus according to the invention is more particularly applicable to high definition sonar equipment by the formation of channels, such as acoustic cameras and target classification systems in submarine technology, imaging taking place in frontal vision. The invention also applies to medical acoustic imaging and to non-destructive tests.

Radar or sonar systems are generally constituted by at least one transmitter, whose transmitted signals "illuminate" the angular field to be observed and a receiving transducer array, whose signals received are used for forming a system of angular channels covering this field. To each channel formed corresponds a distribution of the energy received in the space, whose angular width of the major lobe at the half power defines the angular resolution.

It is known to bring about imaging by means of transmitting and receiving arrays formed by lines of transducers in orthogonal directions. The signals received about a frequency f by the transducers of the receiving array are delayed or phase-displaced relative to one another to form channels in directions forming a constant angle with the direction of said receiving array.

The signals transmitted about frequency f by the transducers of the transmitting array are delayed or phase-displaced relative to one another to form channels in directions forming a constant angle with the direction of the transmitting transducers. The formation of the transmission channels takes place sequentially in time.

Thus, fine transmission and reception channels are successively obtained with angular widths of the 3 dB attenuation diagrams = $\lambda/L$, in which $\lambda$ is the wavelength corresponding to the frequency f in the propagation medium and L the length, which is assumed to be equal, of the transmitting and receiving arrays.

This prior art apparatus for forming fine angular channels has the disadvantage of a low information rate, because transmission must take place on all the transmitters the same number of times that there are transmission channels.

It is also known to carry out acoustic imaging with a single transmitter which gives the desired angular field. The receiving array in this arrangement is formed by several lines of transducers. Processing of all the signals received by the transducer makes it possible to form fine angular channels in two directions. If a large number of channels is to be formed, which is generally the case when it is desired to obtain a fine angular resolution, there is a large number of receivers and the volume of the electric circuits is also considerable.

It is known to form channels by using acoustic lenses. However with this process the angular field remains limited to a few degrees and requires a "retina" in the focusing plane.

BRIEF SUMMARY OF THE INVENTION

The apparatus according to the invention obviates these disadvantages by transmissions at codes differing from the transmitters forming the transmitting array. This procedure makes it possible to form transmission channels with reduced means. In addition, imaging is obtained in real time.

More specifically the present invention relates to an imaging system making it possible to obtain $P \times Q$ resolution points along coordinates of parameters $\theta$ and $\phi$ comprising a transmitting array constituted by M transmitters, $(E_1, E_2, \ldots, E_i, \ldots E_M)$ simultaneously transmitting coded signals $(C_1, C_2, \ldots, C_i \ldots C_M)$, the codes all being different and separable, a receiving array constituted by N receivers, $(H_1, H_2, \ldots H_j \ldots H_N)$ receiving the signals diffused by the targets, means for processing the signals received and means for exploiting the processed signals, wherein the processing means comprise in combination means for forming P angular channels called "reception channels" along the coordinate $\theta$ and means for forming Q angular channels called "transmission channels on reception" along coordinate $\phi$.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
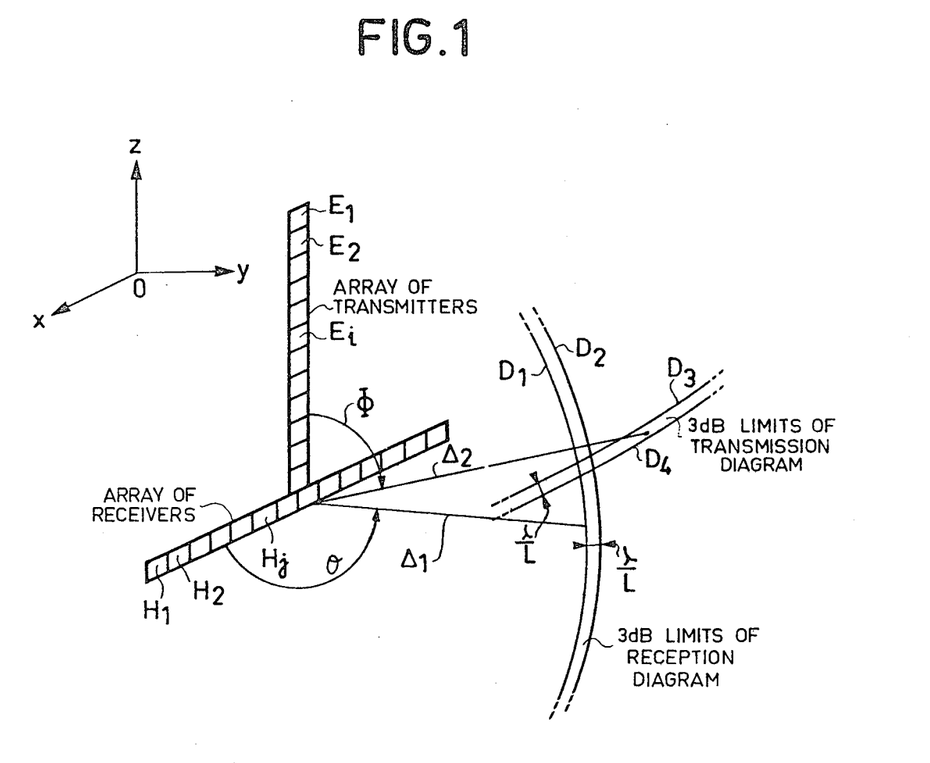
FIG. 1—a diagrammatic representation of the formation of transmission and reception channels.

The apparatus according to the invention comprises a transmitting array constituted by M transmission transducers $E_1, E_2 \ldots E_i, \ldots E_M$ and a receiving array comprising N reception transducers $H_1, H_2, \ldots, H_j, \ldots H_N$ (FIG. 1). On this figure is shown a linear transmitting array in accordance with a direction Oy and a linear receiving transducer array in accordance with the perpendicular direction Ox.

According to the invention the transmitting-receiving array can be constituted by a system of transducers, whereof a certain number can have transmission functions, whereas others can have reception functions. It is possible to have transducers having both transmission and reception functions. These transducers appropriately sample the space in such a way that channels can be formed both on transmission and on reception.

The distribution of the transducers can be of a random nature, provided that their coordinates are known. However, the most frequently used arrangements are trirectangular, spherical, cylindrical, circular, or planar.

The transmission-reception apparatus of FIG. 1 makes it possible to form reception channels in direction $\Delta_1$ and transmission channels in a mean direction $\Delta_2$. With directions Ox and Oz straight lines $\Delta_1$ and $\Delta_2$ respectively form angles $\theta$ and $\phi$. It is possible to see lines $D_1$ and $D_2$ of the limit curves of the 3 dB attenuation diagrams of the reception channels. In the same way $D_3$ and $D_4$ are the lines of the limit curves of the transmission channels for the 3 dB attenuation diagrams. If L is the length of two arrays, the widths of these channels are equal to $\lambda/L$.

According to the invention transmission is such that transducers $E_1, E_2, \ldots, E_i \ldots, E_M$ of known spatial coordinates simultaneously transmit M coded signals $C_1, C_2, \ldots, C_i, \ldots, C_M$ which are separable and of the same band b and same duration T. The total band occupied by all the transmission is equal to B. The main possible transmission types are, for example:

1. M signals at pure frequencies $f_1, \ldots, f_i, \ldots, f_M$ of duration T frequency-separated by $b=(1/T)$.
2. M signals of the same centre frequency $f_o$ coded in the same band b in accordance with M orthogonal codes of duration T with $bT>M$.
3. M signals coded in the same band b in accordance with the same code of duration T with $bT>1$ and of different centre frequencies frequency-separated by the value b.
4. M signals coded in the same band b in accordance with Q orthogonal codes of duration T with $bT>Q$ and P different centre frequencies such that $PQ=M$ frequency-separated by the value b.

Reception consists of receiving on the different receivers $H_j$ the echoes coming from the transmissions, each receiver receiving during a recurrence all the echoes from the waves transmitted by all the transmitters $E_1$ to $E_M$, the signals produced by these echoes being processed in two stages:

1. Formation of reception channels $V_k$ in several directions of angles such that $\theta=\theta_k$.
2. Formation of transmission channels on receiving each signal of channel $V_k$ in several directions defined by angles such as $\phi_i$.

The principle of forming transmission channels on reception according to the invention in general terms consists of using omnidirectional transmitters $E_1$ to $E_M$ distributed in space in accordance with a particular geometry and transmitting M separable signals. In each direction determined by angles $\theta$ and $\phi$ of the space is propagated a signal $S(\theta, \phi)$ formed by the sum in amplitude and phase of the signals transmitted in this direction. This signal $S(\theta, \phi)$ depends on the direction and the geometrical position of the transmitters.

For each signal of reception channel $V_k(\theta_k)$ the formation of a transmission channel of angle direction $\phi=\phi_i$ consists of correlating signal $V_k(\theta_k)$ by signals $S_{i,k}(\phi_i, \theta_k)$.

Figure 2:
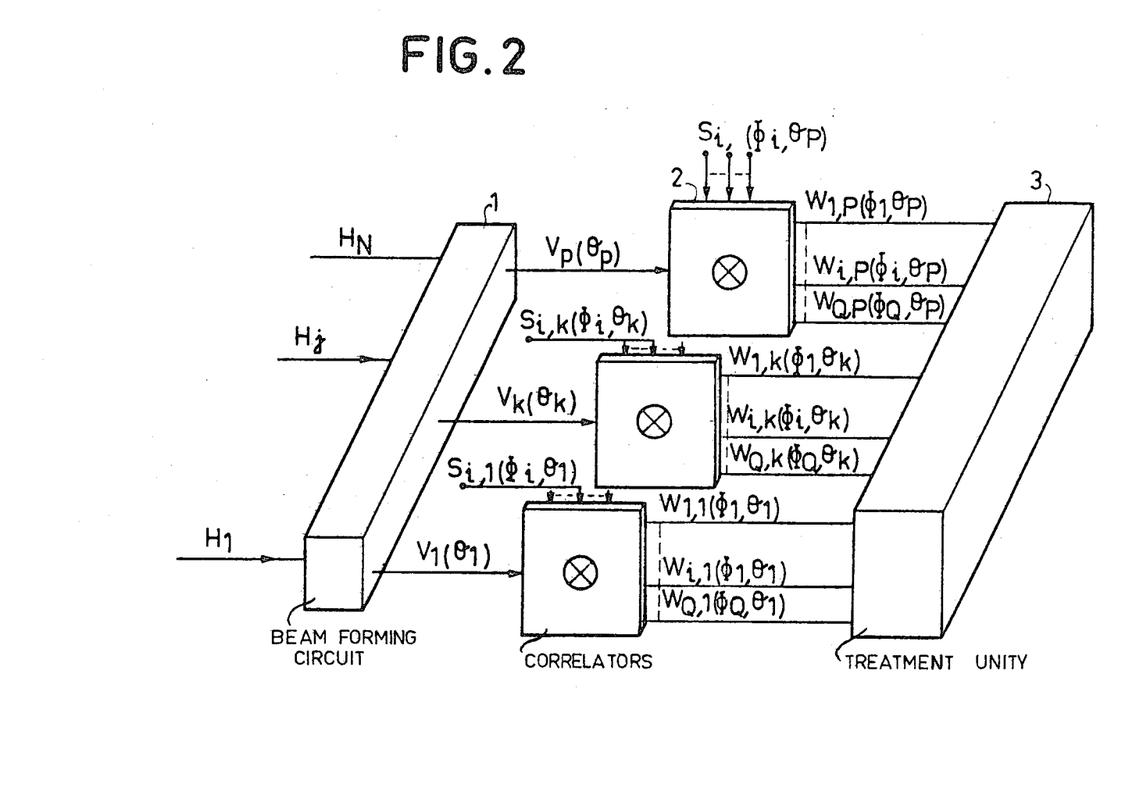
FIG. 2—a general diagram of the circuits for processing the reception signals according to the invention.

The general synoptics of the system is shown in FIG. 2, System 1 receiving N signals from N receivers of the array forms P reception channels of angle directions $\theta=\theta_1, \theta_2, \ldots, \theta_k, \ldots, \theta_p$ supplying signals of channels $V_k(\theta_k)$.

Each signal of a channel such as $V_k(\theta_k)$ is transmitted into a processing system 2, which performs the filtering matched to Q signals $S_{i,k}(\phi_i, \theta_k)$ forming Q channels. In the drawing this operation is symbolized by $\otimes$. At the output of the P systems 2 P×Q signals of channels $W_{i,k}(\phi_i, \theta_k)$ are obtained and are then exploited in the treatment unity 3.

The processing system 1 forming the reception channels $V_k$ can be obtained by two known methods related to the type of receiving array and the frequency band of the signals $H_i$ received.

The first method is applicable to all types of receiving arrays. The processing means used on the signals received by all the receivers are dependent on whether the value of the depth of receiving transducer array p is greater or smaller than C/B, in which C is the velocity of the waves in the propagation medium, B being the band width of the transmitted signals. The depth of the receiving transducer array is defined by the maximum path difference of the waves between two receivers:

(a) if p>C/B, devices compensating delays between the signals from the receivers for the direction of the preformed channel are used;

(b) if p<C/B, phase-displacement devices are used for compensating the phase displacements between the signals from the receivers for the direction of the preformed channel.

The second method is applicable when the receiving array is formed by equidistant receivers and when the antenna depth p is less than C/B. The processing means used on the signals received by all the receivers involve a multiplexing of the signals received in a small interval of time compared with 1/B supplying a sequence of the signals in series in time, followed by a digital or analog device which effects the Fourier transform of this sequence. Such a channel formation device using a digital method is described in an article by J. R. WILLIAMS in "Journal of Acoustical Society of America", vol. 44, 5, pp. 1454–1455, 1968.

The processing system 2 forming the transmission channels by matched filtering can be realized either by processing each signal of transmission channel $V_k(\theta_k)$ in parallel in Q filters matched to Q signals $S_{i,k}(\phi_i, \theta_k)$, i varying between 1 and Q, or by processing each signal of reception channel $V_k(\theta_k)$ sequentially by convoluting it with Q time-reversed copies of signals $S_{i,k}(\phi_i, \theta_k)$.

The preferred embodiment of the invention involves a transmitting array formed by a linear array of transmitters and a receiving array formed by linear equidistant receivers. The two arrays are positioned orthogonally to one another, as indicated in FIG. 1. The transmission band B and the antenna depth p are chosen so as to be able to form reception channels $V_k(\theta_k)$ by the method using a Fourier transform. According to the preferred embodiment of the invention this Fourier transform is produced in analog manner by the use of elastic wave dispersive filters. The transmission channels are formed by sequential correlation of reception channel signals with signals $S_{i,k}$ obtained by their convolution with time-reversed signals $S_{i,k}$. According to the preferred embodiment of the invention this convolution is carried out in analog manner by the use of an elastic wave convolvers. This has the advantage of permitting high operating speeds and leading to reduced overall dimensions.

Figure 3:
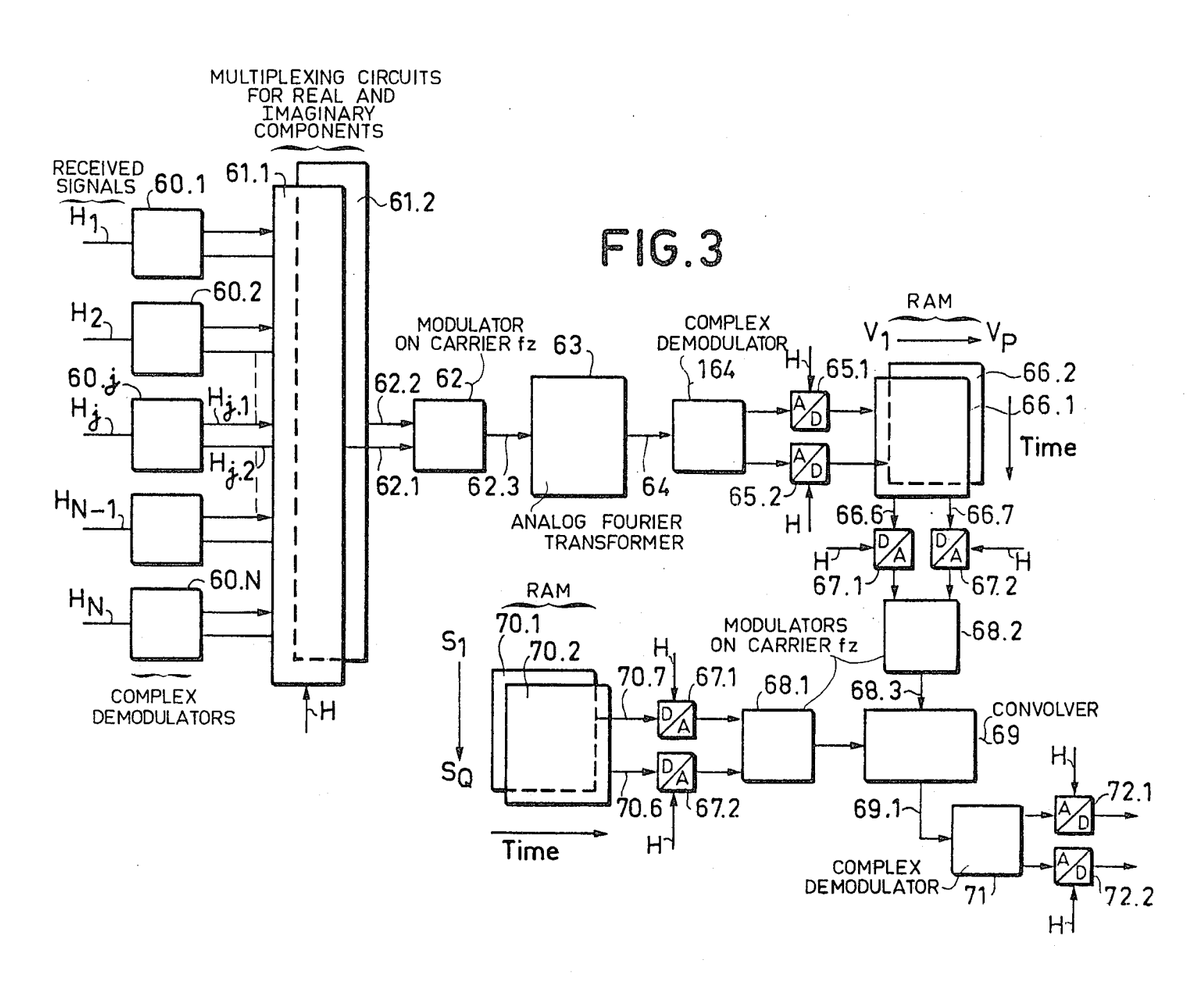
FIG. 3—a diagram of these processing circuits in an embodiment according to the invention.
Figure 4:
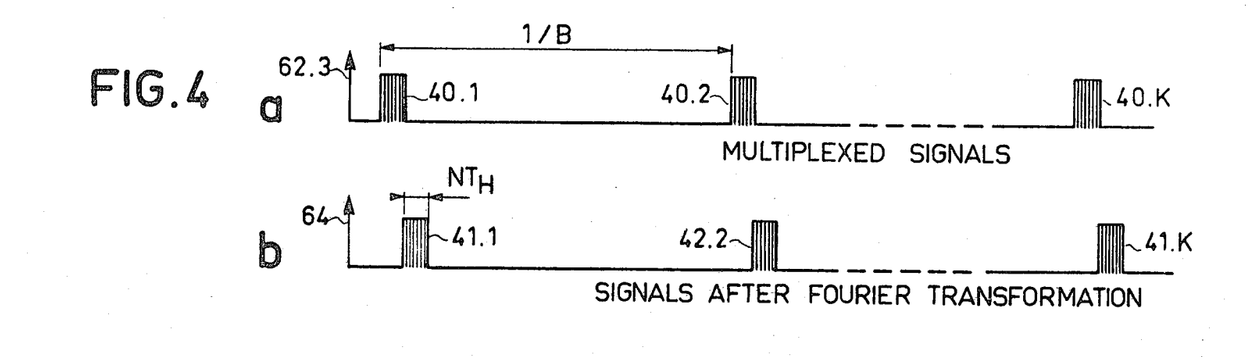
FIGS. 4 and 5—timing signals obtained by processing the reception signals.
Figure 5:
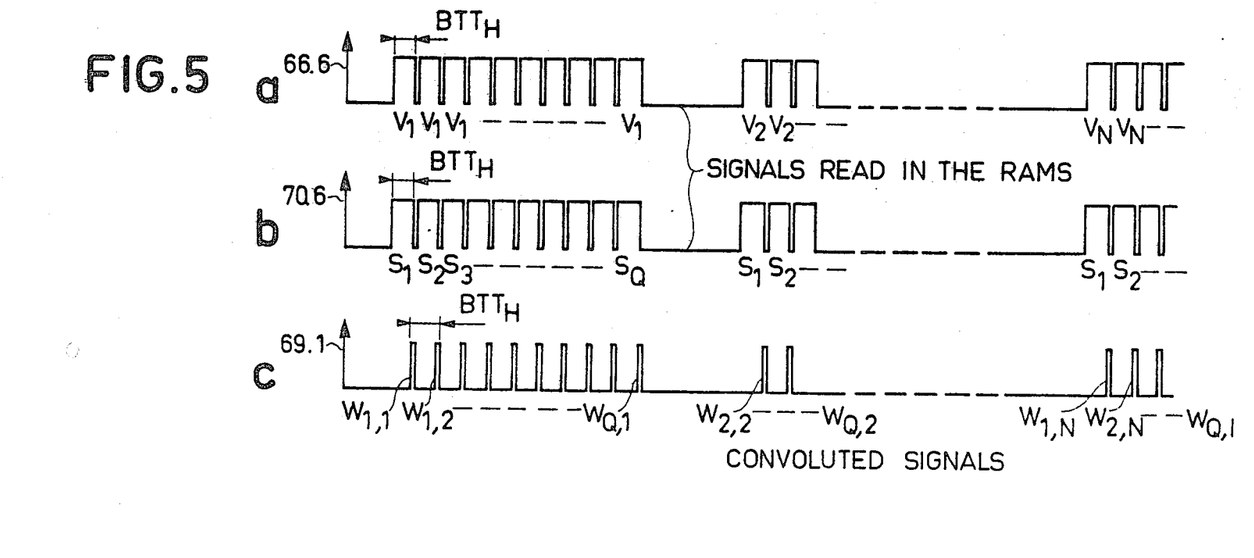

The preferred embodiment of the invention is shown in FIG. 3 and FIGS. 4 and 5 show the main timing signals relating thereto.

The not shown transmitting array comprises a linear array of M transmitters receiving the coded signals $C_1$ to $C_M$ from the generator. The M transmissions are produced simultaneously, their duration being T and their band b. The possible transmission types are as described hereinbefore. The centre frequency of these transmissions is $f_o$ and the total band occupied is B.

The signals are received by a linear receiving array formed of N equidistant receivers $H_1$ to $H_N$, e.g. hydrophones in the case of a sonar. These signals are demodulated by N circuits 60.1, 60.2, ... 60.N shown in FIG. 6. Each signal received by a receiver such as $H_j$ is multiplied in $M_1$ and $M_2$ by two signals cos $(2\pi f_o t)$ and sin $(2\pi f_o t)$ in phase quadrature, supplied by a local oscillator. In this way signals $H_{j,1}$ and $H_{j,2}$ are obtained after low pass filtering in 161 and 167 with a cut-off frequency close to B/2, said two signals being called the real component and the imaginary component. Two synchronous multiplexers 61.1 and 61.2 multiplex the real and imaginary components of the N demodulated signals $H_{j,1}$ and $H_{j,2}$. These multiplexing circuits are controlled by a timing signal H of period $T_H$, whose value is chosen so that N signals by a receiver such as $H_j$ are multiplexed in a time interval $NT_H$, which is small compared with 1/B. Furthermore the signal of each hydrophone is sampled at frequency B and at the output of each multiplexing circuit a signal is obtained which is formed by groups of signals of duration $NT_H$ separated by a time 1/B. These two signals 62.1 and 62.2 obtained at the output of the two multiplexers 61.1 and 61.2 are modulated in a circuit 62 shown in FIG. 7. They are multiplied in multiplying circuits $M_4$ and $M_3$ by the two signals cos $(2\pi f_z t)$ and sin $(2\pi f_z t)$ supplied by a local oscillator, then the two signals obtained are added in an adding circuit 70.1 and the signal obtained is filtered in a low pass filtering circuit 70.2 of width $B_z$ and of centre frequency $f_z$. Band $B_z$ is a function of the multiplexing frequency of signals such as $H_{j,1}$ and $H_{j,2}$ and the centre frequency $f_z$ is made approximately three times the value of band $B_z$.

The output signal 62.3 from modulator 62 is diagrammatically shown in FIG. 4a. Over a time T it is formed by $K=BT$ groups of signals 40.1, 40.2, ... 40.K. Each group corresponds to the signals received by receivers $H_1, H_2, \ldots H_N$ in series with period $T_H$. These signals have a band $H_z$, a centre frequency $f_z$ and a duration $T_z$ equal to $NT_H$, which is small compared with 1/B.

This output signal 62.3 from modulator 62 is transmitted into an analog Fourier transformer 63 using elastic wave dispersive filters and for which two embodiments are possible. Fourier transformers by dispersive filters are more particularly described in the article by C. LARDAT in "Proceedings 1978 IEEE Ultrasonic Symposium", pp. 518–521, 1978.

Figure 8:
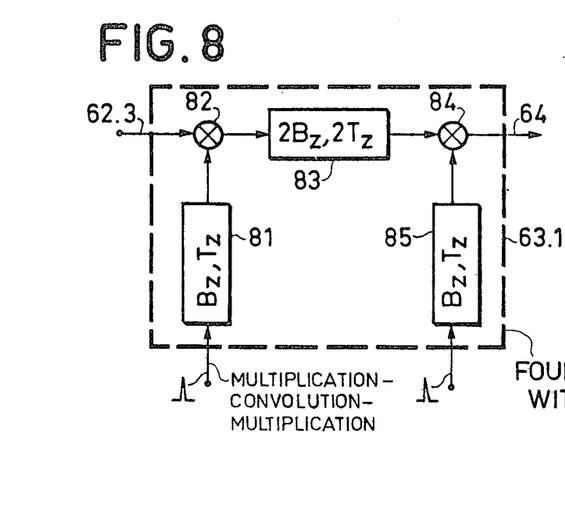
FIGS. 8 and 9—two diagrams relating to the Fourier transformation by elastic wave dispersive filters.

The first embodiment shown in FIG. 8 is a so-called M-C-M arrangement (multiplication-convolution-multiplication). In this arrangement the input signal 62.3 is pre-multiplied in a multiplication circuit 82 by a signal called a chirp, which is linearly modulated in frequency and whose band is $B_z$ and whose duration is $T_z$. This signal is obtained by supplying a very short pulse to the input of a dispersive filter 81. The signal at the output of multiplier 82 is convoluted in a dispersive filter 83, whose band is $2B_z$ and whose duration is $2T_z$. The signal obtained is then post-multiplied in a circuit 84 by a chirp signal which is identical to the aforementioned signal generated by dispersive filter 85. The Fourier transform signal of the input signal 62.3 is obtained at output 64 of multiplier 84.

Figure 9:
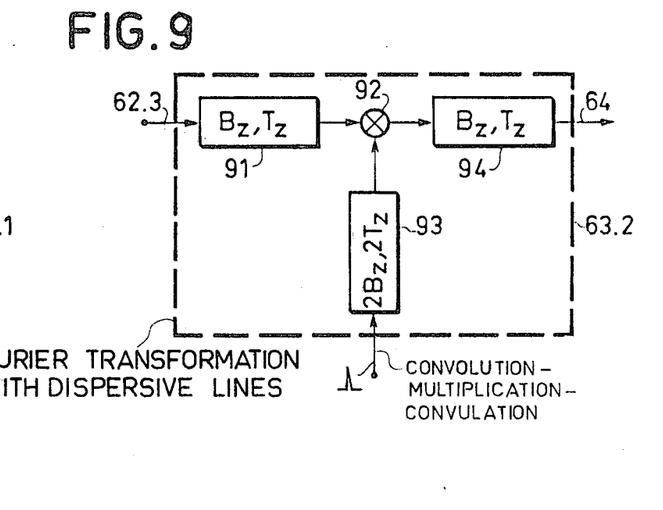

The second embodiment shown in FIG. 9 is a so called C-M-C arrangement (convolution-multiplication-convolution). In this arrangement the input signal 62.3 is firstly convoluted in a dispersive filter 91 of band $B_z$ and duration $T_z$, then multiplied in 92 by a chirp signal supplied by a dispersive filter 93 of band $2B_z$ and duration $2T_z$. The signal obtained at the output of multiplier 92 is then transmitted into a dispersive filter 93 identical to filter 91. The Fourier transform signal of signal 62.3 is obtained at the output of dispersive filter 94 at 64.

The output signal 64 of a Fourier transform 63 is diagrammatically shown in FIG. 4b. Like the input signal it is formed over time T by $K=BT$ groups of signals 41.1, 41.2, ..., 41.K. Each group consists of N signals of channels $V_1$ to $V_N$ in series in time of period $T_H$ and period $NT_H$. They are staggered by the time taken for carrying out the Fourier transformation compared with input signals 62.3.

The Fourier transform signal 64 is then demodulated in circuit 164 (FIG. 3) having an identical structure to circuit 60 in which the phase quadrature signals are cos $(2\pi f_z t)$ and sin $(2\pi f_z t)$. The two components obtained are converted into digital form by two converters 65.1 and 65.2 controlled by timing circuit H and stored separately in digital memories 66.1 and 66.2, said memories being for example of the RAM type. Each group of channel signals such as 41.i is entered in the memory in the form of a line. The memory is thus filled sequentially line by line at rate 1/B and contains $K=BT$ lines. The signals stored in this way are sequentially read column by column at speed 1/B. The memory is, for example, subdivided into two blocks which are used alternately involving filling one block line by line and simultaneously reading, as well as the other block column by column, followed by the switching of blocks.

The transmitting array is formed by a linear array of transmitters, signals $S_{i,k}(\phi_i, \theta_k)$ defined hereinbefore being dependent only on the directions defined by angle $\phi_i$ with the transmitting antenna and can then be expressed according to $S_i(\phi_i)$.

The system comprises digital memories 70.1 and 70.2, e.g. of the RAM type and which contain demodulated, time-reversed copies of the Q signals $S_i(\phi_i)$ in the form of real and imaginary components. These Q signals are stored for time T at frequency B and thus comprise K samples.

Two signals $V_k(\theta_k)$ and $S_i(\phi i)$ are read in synchronism respectively into memories 66.1, 66.2 and 70.1, 70.2 under the control of timing circuit H. Their duration is identical and equal to $KT_H$. The same signal of channel $V_k(\theta_k)$ is read Q times synchronously with the Q signals $S_1$ to $S_Q$. FIGS. 5a and 5b respectively show the signals of channels $V_k$ and the signals $S_i$ as a function of time. Each signal is composed of Q groups of $KT_H$ signals in series in time. The reading speed 1/B of signals $V_k$ or $S_i$ must therefore be equal to or greater than QKTH.

The output signals 66.6, 66.7 and 70.6, 70.7 from memories 66 and 70, as shown in FIGS. 5a and 5b are converted into analog form by converters 67.1, 67.2, modulated by the two circuits 68.1, 68.2 and applied to the two inputs of a convolver 69 using the propagation of elastic waves.

Figures 6, 7:
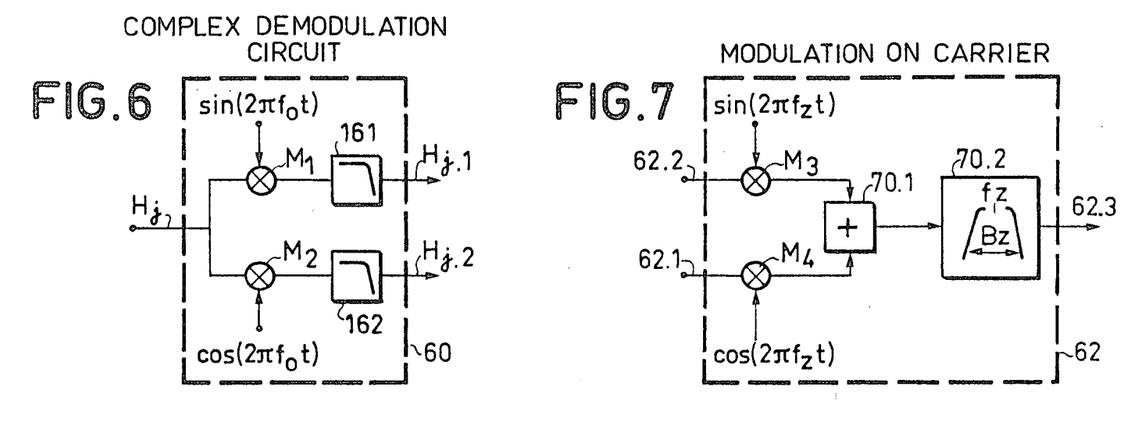
FIG. 6—the demodulation diagram of the signals received.
FIG. 7—the diagram of bringing the processed signals on the carrier frequency.

These signals read into the memories are modulated about the frequency $f_z$ and in band $B_z$, circuits 68.1 and 68.2 being identical to circuit 62 of FIG. 7. Convolver 69 operates around the centre frequency $f_z$ and around band $B_z$, being shown in FIG. 10.

Figure 10:
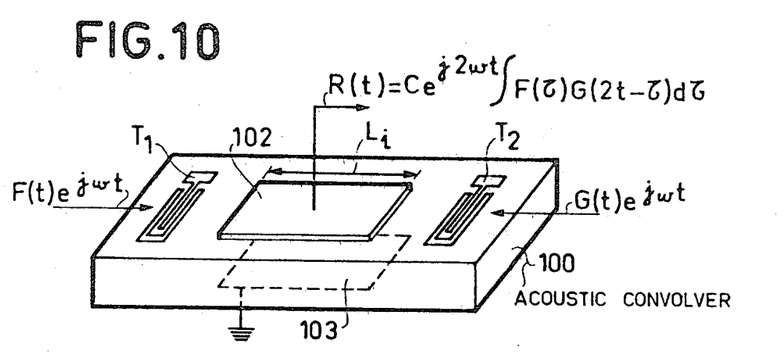
FIG. 10—the circuit diagram of a convolution device with a non-linear effect by surface waves.

The known acoustic surface wave device 100 (FIG. 10) is provided with two electrodes 102 and 103 of length $L_i$. The signals to be convoluted $F(t)e^{j\omega t}$ and $G(t)e^{j\omega t}$, in which $\omega$ is the angular frequency of the carrier are applied to interdigital transducers $T_1$, $T_2$ placed at the two ends of device 100. As a result of non-linear effects between the two electrodes is collected the convoluted signal R(t) such that $$R(t) = Ce^{2j\omega t}\int F(t)G(2t-\tau)d\tau$$

in which C is a constant.

If v is the elastic wave velocity the interaction length $L_i$ is equal to $KT_H \times v$. The output signal of the convolver is represented in FIG. 5c. It consists of channel $V_k$ of Q correlation signals separated by a time equal to $KT_H$ and of centre frequency $2f_z$ relating to channel signals formed in accordance with Q directions $\phi_i$ for direction $\theta_k$ or $W_{1,k}$ to $W_{Q,k}$. These signals leave the convolver with a time displacement equal to the duration $KT_H$ of the input signals.

The output signal from the convolver is then demodulated in circuit 71, identical to circuit 60 shown in FIG. 6 in which the frequency $f_o$ is replaced by the frequency $2f_z$ supplied by a local oscillator. It is then converted into digital form by converters 71.1 and 71.2 for storage in a memory or for exploitation. These signals supply an image in two dimensions $\theta$, $\phi$ for a duration T.

If the transmitting array is of a random nature in this case memories 70.1, 70.2 must store the copies of Q×N signals $S_{i,k}(\phi_i, \theta_k)$ and their size is greater. Whenever a signal of channel $V_k(\theta_k)$ is read in memories 66.1 and 66.2, Q corresponding signals $S_{l,k}(\phi_1, \theta_k)$ to $S_{Q,k}(\theta_Q, \theta_k)$ are read in memories 70.1 and 70.2.

An acoustic imaging system according to the invention with orthogonal linear arrays for transmission and reception has the following characteristics:
number of transmitters M=50
number of receivers N=50
spacing between transmitters and receivers d=0.75 mm
mean frequency of transmissions $f_o$=3 MHz
pulse time T=10 ms
total band B=5 kHz, i.e. 1/B=200 μs
angular field in $\theta$ and in $\phi$=±20 degrees
depth of arrays in time=20 μs
clock period $T_H$=50 ns
band $B_z$=20 MHz
frequency $f_z$=100 MHz.

For this embodiment the number of channels Q is taken as equal to N. Moreover product BT is equal to Q in such a way that N=M=Q=BT=K. The condition $QBTT_H<1/B$ is satisfied. The duration of the signals at the input and output of the Fourier transformer, as well as at the convolutor input is equal to 2.5 μs.

Figure 11:
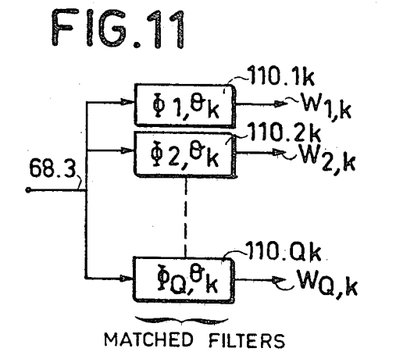
FIG. 11—a diagram relating to the formation of the transmission channels.

A constructional variant is shown in FIG. 11. It applies the parallel processing referred to hereinbefore. The output signal for each channel such as $V_k(\theta_k)$ from modulator 68.2 to 68.3 (FIG. 3) is simultaneously transmitted to the input of Q filters 110.1k, 110.2k, ... 110.Qk matched to signals $S_{1,k}$ to $S_{Q,k}$. These filters are, for example, realized by using the propagation of the elastic waves, the duration of the pulse response of each filter corresponds to time T and each filter leads to a processing equivalent to one convolution, whilst the output signals from each matched filter have a maximum representing the signal from a direction $\phi_i$, $\theta_k$.

In the case where the transmitting array is formed by a linear array of transmitters the system of Q filters 110.1k to 110.Qk remains identical for the N signals of channels $V_k(\theta_k)$ and can be multiplexed.

Figure 12:
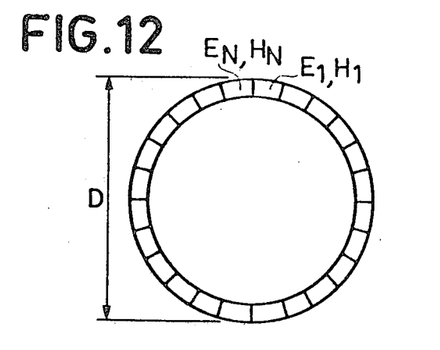
FIG. 12—an embodiment of a transmitting-receiving antenna with transducers in a ring arrangement.

A variant of the invention is shown in FIG. 12, which represents an array formed by a ring of transducers of diameter D. Each transducer is both a transmitter and a receiver. In the transmission function the transducers simultaneously supply N coded transmissions. Reception channels are formed in a plane prependicular to the plane of the antenna by means in accordance with the first method described hereinbefore. In this plane the directional pattern obtained by the reception channel has an angular width of approximately $\lambda_o/D$ if $\lambda_o$ is the mean wavelength of the transmissions. Transmission channels are then formed in the plane orthogonal to the reception channel formation plane by one of the two means referred to hereinbefore. In this plane the directional pattern obtained by the transmission channel also has an angular width of approximately $\lambda_o/D$.

Figure 13:
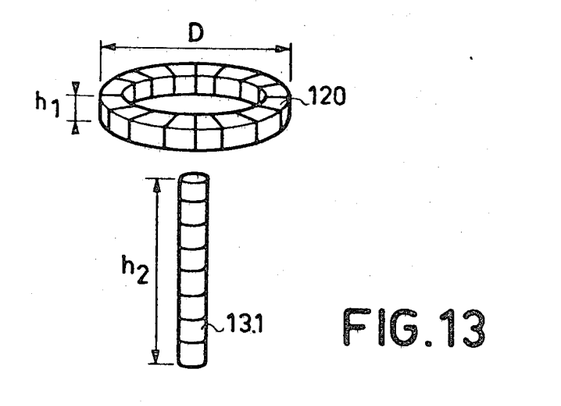
FIG. 13—an apparatus according to the invention with a receiving array in ring form and a transmitting array in linear form.

FIG. 13 shows an array formed on the one hand by a ring of transducers 30 of diameter D and on the other by a column of transducers 120 of height $h_2$.

Column 13.1 is formed by omnidirectional transmitters in angle direction $\theta$, said transmitters simultaneously supplying coded transmissions. Ring 120 is formed by receivers of height $h_1$ in such a way that the directional pattern in accordance with angle $\phi$ has an angle width of approximately $\lambda_o/h_1$.

Reception channels in accordance with the angle $\theta$ are formed over the complete horizon, i.e. 0° to 360° by means corresponding to the first method described hereinbefore. The directional pattern obtained by the reception channel has an angular width of approximately $\lambda_o/D$. Transmission channels in accordance with the angle $\phi$ are then formed by one of the two means described hereinbefore, the directional pattern obtained by the transmission channel has an angular width of approximately $\lambda_o/h_2$ and its value is well below $\lambda_o/h_1$.

To increase the transmitted power it is possible to replace each transmitter such as 13.1 of the column by a ring identical to that formed by the transducers in such a way that a cylindrical array is obtained.

It is also possible to reverse the functions of the ring and column, the ring then being formed by transmitters, each supplying a different code and the column being formed by receivers. In this case the reception channels can be formed by a Fourier transform in the case of a narrow band. In this way a panoramic imaging system is obtained.

What is claimed is:

1. An imaging system comprising:
    a transmitting array including plural omnidirectional transducers each simultaneously transmitting respective differently coded signals;
    a receiving array including plural tranducers each adapted to receive signals transmitted by said transmitting array and reflected off a target, each said receiving array tranducer producing a respective output signal; and
    means for processing the output signals produced by said receiving array tranducers, comprising,
    means for forming P reception channels and generating respective reception signals $V_1(\theta)$, $V_2(\theta_2)$, ... $V_k(\theta_k)$, ... $V_p(\theta_p)$ corresponding respectively to predetermined increments $\theta_1$, $\theta_2$, ... $\theta_k$, ... $\theta_p$ along a predetermined angular coordinate $\theta$,
    means for forming Q transmission channels along a second angular coordinate $\phi$ and for generating respective signals $S_{i,k}(\phi_i, \theta_k)$ corresponding respectively to predetermined increments $\phi_1, \phi_2, \ldots, \phi_i \ldots \phi_q$ along a predetermined angular coordinate $\phi$ for each of said reception channels, wherein the signals $S_{i,k}(\phi_i, \theta_k)$ are the sum in amplitude and phase of the coded signals transmitted by said transmitting array in the direction referenced by angular coordinates $\phi_i$ and $\theta_k$, means for performing matched filtering of each of said signals $V_k(\theta_k)$ with a respective set of said signals $S_{i,k}(\phi_i, \theta_k)$ and for producing respective output signals, and means for forming $P \times Q$ image points based on the output signals produced by said matched filtering performing means.

2. An imaging system according to claim 1, wherein the matched filtering performing means comprises:
Q filters in parallel for each signal of channel $V_k(\theta_k)$.

3. An imaging system according to claim 1, wherein the matched filtering performing means comprises:
means for performing the convolution of each signal of channel $V_k(\theta_k)$ with Q time reversed signals $S_{i,k}(\phi_i, \theta_k)$.

4. An imaging system according to claim 3, wherein the convolution performing means comprises:
an analog convolver using the propagation of elastic waves in solids,
means for modulating the signals $V_k(\theta_k)$ and $S_{i,k}(\phi_i, \theta_k)$, about a center frequency and in a band permitting the use of such a convolver, and
means for sequentially convoluting channel $V_k(\theta_k)$ Q times with the Q time-reverse signal $S_{i,k}(\phi_i, \theta_k)$ in a time less than 1/B, B being the frequency band of the signals received.

5. An imaging system according to claim 1, wherein the receiving array comprises:
a linear array of N equidistant receivers wherein the depth of the receiving array tranducers in the most inclined direction is less than C/B, C being the propagation velocity of the signals received and B being the frequency band of the signals received.

6. An imaging system according to claim 5, comprising:
a demodulation circuit, having applied thereto the signals received by each of said receiving array transducers, for supplying respective real and imaginary components of the corresponding receiving array transducer signal, and
first and second multiplexers respectively having applied thereto real and imaginary components supplied by said demodulation circuit, the period $T_H$ of the multiplexing operations being such that $NT_H < 1/B$.

7. An imaging system according to claim 6, comprising:
a Fourier transform circuit having the two multiplexed signals applied thereto for supplying the Fourier transform of these multiplexed signals.

8. An imaging system according to claim 7, comprising:
analog means for performing the Fourier transform in an analog manner, including,
a system of dispersive filters using the propagation of the elastic waves in solids supplying N signals of channels $V_k(\theta_k)$ sequentially in time for a duration equal to $NT_H$ and which is well below 1/B.

9. An imaging system according to claim 8, comprising:
means for demodulating the two multiplexed real and imaginary components about a center frequency and in a band permitting the use of said dispersive filters.

10. An imaging system according to claim 8, comprising:
means for demodulating, the signals of channels $V_k(\theta_k)$, and
means for converting the demodulated real and imaginary components obtained into digital form.

11. An imaging system according to claim 10, comprising:
a digital memory for storing the real and imaginary components of the N channel signals.

12. An imaging system according to claim 6, comprising:
means for sampling the signal from each receiver at frequency 1/B such that N channel signals are supplied in the time interval 1/B.

13. An imaging system according to claims 11 or 12, comprising:
means for writing data into the digital memory line by line, each line storing N channel signals corresponding to N directions $\theta_1$ to $\theta_N$, wherein the memory is filled at the end of time T and has BT lines.

14. An imaging system according to claim 13, comprising:
means for reading the digital memory column by column at speed 1/B and successively supplying the signals of channels $V_k(\theta_k)$ for the duration T in the form of two real and imaginary components having BT samples, wherein the BT samples are read at period $T_H$.

15. An imaging system according to claim 14, comprising:
means for converting the two components of each signal of channel $V_k(\theta_k)$ into analog form, and
means for modulating the converted analog signals about the center frequency and in the band of the convolver.

16. An imaging system according to claim 15, comprising:
another digital memory for storing the $N \times Q$ copies of the signals $S_{i,k}(\phi_i, \theta_k)$ of two real and imaginary components, each signal having BT samples, including,
means for reading in each signal in the memory at speed 1/B and the BT samples of each signal at $T_H$,
means for converting the two components into analog form, and
means for modulating the two components converted into analog form about the center frequency and in the band of the convolver.

17. An imaging system according to claim 16, comprising:
the elastic wave convolver having applied thereto in synchronism the two modulated signals $V_k(\theta_k)$ and $S_{i,k}(\phi_i, \theta_k)$, their duration being equal to $BTT_H$, wherein $QBTT_H$ is chosen lower than 1/B.

18. An imaging system according to claim 29, wherein the transmitting array comprises:
a linear array of transmitters positioned orthogonally to the receiving array.

19. An imaging system according to claims 2 or 14, comprising:

means for transmitting each signal $V_k(\theta_k)$ to said set of Q filters matched to signals $S_{i,k}(\phi_i, \theta_k)$ whose pulse response has a duration T.

20. An imaging system according to claim 19, comprising:

means for modulating each signal $V_k(\theta_k)$ about the center frequency and in the band of the matched filters, and said matched filters comprising analog filters based on the propagation of elastic waves in solids.

21. An imaging system according to claim 1, comprising:

means for controlling said transducers to successively fulfil the functions of transmitters and receivers, and at least one of the transducers arrays arranged in ring-like manner.

22. An imaging system according to claim 1, comprising:

said transmitting array transducers arranged in linear manner, and the receiving array transducers arranged in ring-like manner.

23. An imaging system according to claim 1, comprising:

said receiving array transducers arranged in ring-like manner, and the transmitting array transducers arranged in linear manner.

* * * * *